(12) United States Patent
De Lorenzo et al.

(10) Patent No.: US 9,332,389 B1
(45) Date of Patent: May 3, 2016

(54) INDOOR-OUTDOOR DETECTOR FOR ESTIMATING THE LOCATION OF A WIRELESS TERMINAL

(71) Applicant: Polaris Wireless, Inc., Mountain View, CA (US)

(72) Inventors: David S. De Lorenzo, Palo Alto, CA (US); Ahmed Ahmedin, Davis, CA (US)

(73) Assignee: Polaris Wireless, Inc., Mountain View, CA (US)

( * ) Notice: Subject to any disclaimer, the term of this patent is extended or adjusted under 35 U.S.C. 154(b) by 0 days.

(21) Appl. No.: 14/603,947

(22) Filed: Jan. 23, 2015

(51) Int. Cl.
  *G06F 15/16* (2006.01)
  *H04W 4/02* (2009.01)
  *G01S 5/02* (2010.01)

(52) U.S. Cl.
  CPC ............. *H04W 4/023* (2013.01); *G01S 5/0278* (2013.01)

(58) Field of Classification Search
  CPC ....... H04W 4/02; H04W 16/18; H04W 24/08; H04W 64/00
  USPC .................................. 455/456.1, 456.2, 456.5
  See application file for complete search history.

(56) References Cited

U.S. PATENT DOCUMENTS

| | | | |
|---|---|---|---|
| 8,433,250 B2 | 4/2013 | Bhattacharya et al. | |
| 2009/0184847 A1* | 7/2009 | Kohli | G08G 1/017 340/989 |
| 2011/0189960 A1* | 8/2011 | Bhattacharya | H04B 17/00 455/67.11 |

* cited by examiner

*Primary Examiner* — Sam Bhattacharya
(74) *Attorney, Agent, or Firm* — Kaplan Breyer Schwarz & Ottesen, LLP

(57) ABSTRACT

A disclosed detector estimates the wireless terminal as being indoors or outdoors by utilizing information that includes measurement report data from previous calls involving both i) wireless terminals that are known to have been indoors and ii) wireless terminals that are known to have been outdoors while the measurement report data was collected. Based on this call data, one or more classification features are computed in accordance with the illustrative embodiment of the present invention. Then, for a wireless terminal that is to be classified during a call and with respect to the terminal being either indoors or outdoors, features that are representative of that wireless terminal for the call are evaluated against a characterization that is a composite of one or more previously-computed classification features. The features that are representative of the wireless terminal can be derived from the measurement reports received from the wireless terminal during the call.

19 Claims, 13 Drawing Sheets

INDOOR-OUTDOOR DETECTOR FOR ESTIMATING THE LOCATION OF A WIRELESS TERMINAL

FIELD OF THE INVENTION

The present invention relates to telecommunications in general, and, more particularly, to a technique for determining an estimate of the location of a wireless terminal based on whether the wireless terminal is detected as being indoors or outdoors.

BACKGROUND OF THE INVENTION

The salient advantage of wireless telecommunications over wireline telecommunications is the user of the wireless terminal is afforded the opportunity to use his or her terminal anywhere. On the other hand, the salient disadvantage of wireless telecommunications lies in that fact that because the user is mobile, an interested party might not be able to readily ascertain the location of the user.

Such interested parties might include both the user of the wireless terminal and a remote party. There are a variety of reasons why the user of a wireless terminal might be interested in knowing his or her location. For example, the user might be interested in telling a remote party where he or she is or, alternatively, the user might seek advice in navigation.

In addition, there are a variety of reasons why a remote party might be interested in knowing the location of the user. For example, the recipient of an E 9-1-1 emergency call from a wireless terminal might be interested in knowing the location of the wireless terminal so that emergency services vehicles can be dispatched to that location.

There are many techniques in the prior art for estimating the location of a wireless terminal. In accordance with some techniques, the location of a wireless terminal is estimated, at least in part, from signal measurements that are reported by the wireless terminal. The reported measurements are of signals measured by the wireless terminal that are transmitted by one or more base stations and, in some cases, by Global Positioning System (GPS) satellites. In order for these techniques to work, at least some of the transmitted signals have to be strong enough to allow for accurate measurement by the wireless terminal and for reliable processing by the particular estimation technique. Some of these techniques work well even in environments where the measured strengths of the different signals vary significantly, such as where signal obstructions are present, including natural obstructions such as mountains and artificial obstructions such as buildings.

In some environments, however, signals that are too weak to be usable and environmental conditions that are insufficiently or incorrectly characterized can cause at least some location estimation techniques to produce unreliable location estimates. For example, some indoor environments can cause such problems to occur.

SUMMARY OF THE INVENTION

There are a number of systems in the prior art for estimating the location of a wireless terminal. Several of the factors that affect the accuracy of the estimate are:
1. whether the signals that travel to and from the wireless terminal are impaired (e.g., attenuated, reflected, refracted, etc.) or not,
2. whether the system knows if the signals have been impaired or not, and
3. whether the system compensates for the impairment or not.

When the system knows that the signals have been impaired and compensates for the impairment, the accuracy of the estimate can be very good. In contrast, when the system does not know that the signals have been impaired or does not compensate for the impairment, the accuracy of the estimate can be very bad. The military, police, and emergency services often rely on the estimates to be good, and a bad estimate can have serious consequences.

Signals can be impaired by natural objects such as mountains and by man-made objects such as buildings. The impairment caused when a wireless terminal is indoors is particularly insidious, and it is difficult in the prior art to know that the wireless terminal is indoors.

To address this problem, embodiments of the present invention estimate whether a wireless terminal is indoors or outdoors. Although it is trivial for a human to know whether he or she is indoors or outdoors, and it might seem that it should be simple for a machine to know whether it is indoors or not, it has been a difficult problem.

Embodiments of the present invention estimate whether the wireless terminal is indoors or outdoors by utilizing information for past calls that is readily available in at least some wireless telecommunications systems. This call data includes measurement report data from past calls involving both i) wireless terminals that are known to have been indoors and ii) wireless terminals that are known to have been outdoors while the measurement report data was collected. Based on this call data, one or more classification features are computed in accordance with the illustrative embodiment of the present invention. These features are related to the signal-strength levels of neighbor cells, the number of neighbor cells being reported, and the size of neighbor-cell coverage areas, for example and without limitation. Then, for a particular wireless terminal that is to be classified during a particular call in terms of it being indoors or outdoors, the features that are representative of that wireless terminal for the call are evaluated against a characterization that is a composite of one or more of the previously-computed classification features. The features that are representative of the wireless terminal can be derived from the measurement reports received from the wireless terminal during the call. In some embodiments of the present invention, an estimate of the probability that the wireless terminal is indoors (or outdoors) is generated.

Once it has been determined that the wireless terminal is probably indoors or probably outdoors, this information can be used accordingly. For example, the cost of generating a location estimate—in terms of time, hardware, money, compute cycles, and energy (e.g., electrical, etc.)—depends on the technique and on the quantity and quality of the empirical data. There are some techniques in which the cost of a location estimate can vary widely based on the quantity and quality of the empirical data. This is particularly true for pattern-matching techniques such as Radio-Frequency Pattern Matching. For these techniques, it is advantageous to employ, when possible, mechanisms that lower the average (or maximum) cost of an estimate. The present invention, as recited in the claims, is one such mechanism.

In particular, it is possible to reduce the cost of estimating a location, by recognizing that some estimates of the location of a wireless terminal are improbable. For example, if a wireless terminal is estimated to be indoors, then one or more outdoor locations can be ruled out as improbable. Thus, the illustrative embodiment lowers the cost of the location estimate by quickly eliminating the need to expend resources to consider some, or all, outdoor locations when it is likely that the wireless terminal is indoors. Furthermore, the illustrative embodiment can improve the accuracy of the location estimate by eliminating the possibility of making an error by estimating, in the example, the location of the wireless terminal to be a particular place outdoors when it is actually indoors.

As another example of reducing the cost of estimating a location, if a wireless terminal is estimated instead to be outdoors, then the terminal can be assumed to be at or near ground level. This provides a position constraint along the vertical axis, thereby simplifying the location estimation process. In contrast, a wireless terminal that is estimated to be indoors might be, for example, on any of the floors in a high-rise building (i.e., unconstrained along the vertical axis).

As yet another example of reducing the cost of estimating a location, if a wireless terminal is estimated to be indoors, then equipment such as the GPS radio in the wireless terminal can be powered off (or kept powered off) because it might not be of any use indoors. In this way, energy usage (e.g., battery consumption in the wireless terminal, etc.) is minimized, thereby lowering cost and improving performance (e.g., by extending battery life, etc.) in the system.

Additionally, in regard to location-based applications, different behaviors can be applied depending on whether the wireless terminal—and, therefore, its user—is estimated to be indoors or outdoors. For example, an application might only want to serve an advertisement when a person enters a shop, but not before or if the person is simply walking past. As another example, an application might want to instruct a security officer whether to look in an outdoor crowd or inside a nearby shop for a person of interest. The detector disclosed herein supports these scenarios of location-based applications and others.

An illustrative method of estimating the location of a wireless terminal comprises: receiving, by a server computer, the identities of one or more radio signals that are received by the wireless terminal; and estimating, by the server computer, a probability that the wireless terminal is indoors based on i) the identities of the one or more radio signals that are received by the wireless terminal and ii) a characterization that is based on the amount of unique identities that have appeared over a predetermined interval, wherein the unique identities are of radio signals that have been received by a plurality of wireless terminals.

Another method of estimating the location of a wireless terminal comprises: receiving, by a server computer, the identity of a radio signal that is received by the wireless terminal; receiving, by the server computer, a measurement of a location-dependent trait of a radio signal as received by the wireless terminal; and estimating, by the server computer, a probability that the wireless terminal is indoors based on i) a characterization of a first classification feature, wherein the characterization is based on multiple measurement reports that are transmitted by a plurality of wireless terminals and accounts for both known indoor calls and known outdoor calls, and ii) a value of the first classification feature, wherein the value of the first classification feature corresponds to the identity of the radio signal and is representative of the wireless terminal; and generating, by the server computer, an estimate of the location of the wireless terminal based on i) the measurement of the location-dependent trait of the radio signal and ii) the estimated probability that the wireless terminal is indoors.

Yet another method of estimating the location of a wireless terminal comprises: receiving, by a server computer, the identity of a radio signal that is received by the wireless terminal; receiving, by the server computer, a measurement of a location-dependent trait of a radio signal as received by the wireless terminal; estimating, by the server computer, a probability that the wireless terminal is indoors based on i) a characterization of a first classification feature, wherein the characterization is based on multiple measurement reports that are transmitted by a plurality of wireless terminals, and ii) a value of the first classification feature, wherein the value of the first classification feature corresponds to the identity of the radio signal and is representative of the wireless terminal; designating, by the server computer, at least one of a plurality of possible locations of the wireless terminal as improbable based on the estimated probability that the wireless terminal is indoors; and generating, by the server computer, an estimate of the location of the wireless terminal as being one of the plurality of possible locations of the wireless terminal not designated as improbable, based on the measurement of the location-dependent trait of the radio signal.

DETAILED DESCRIPTION

Based on—

Figure 1:
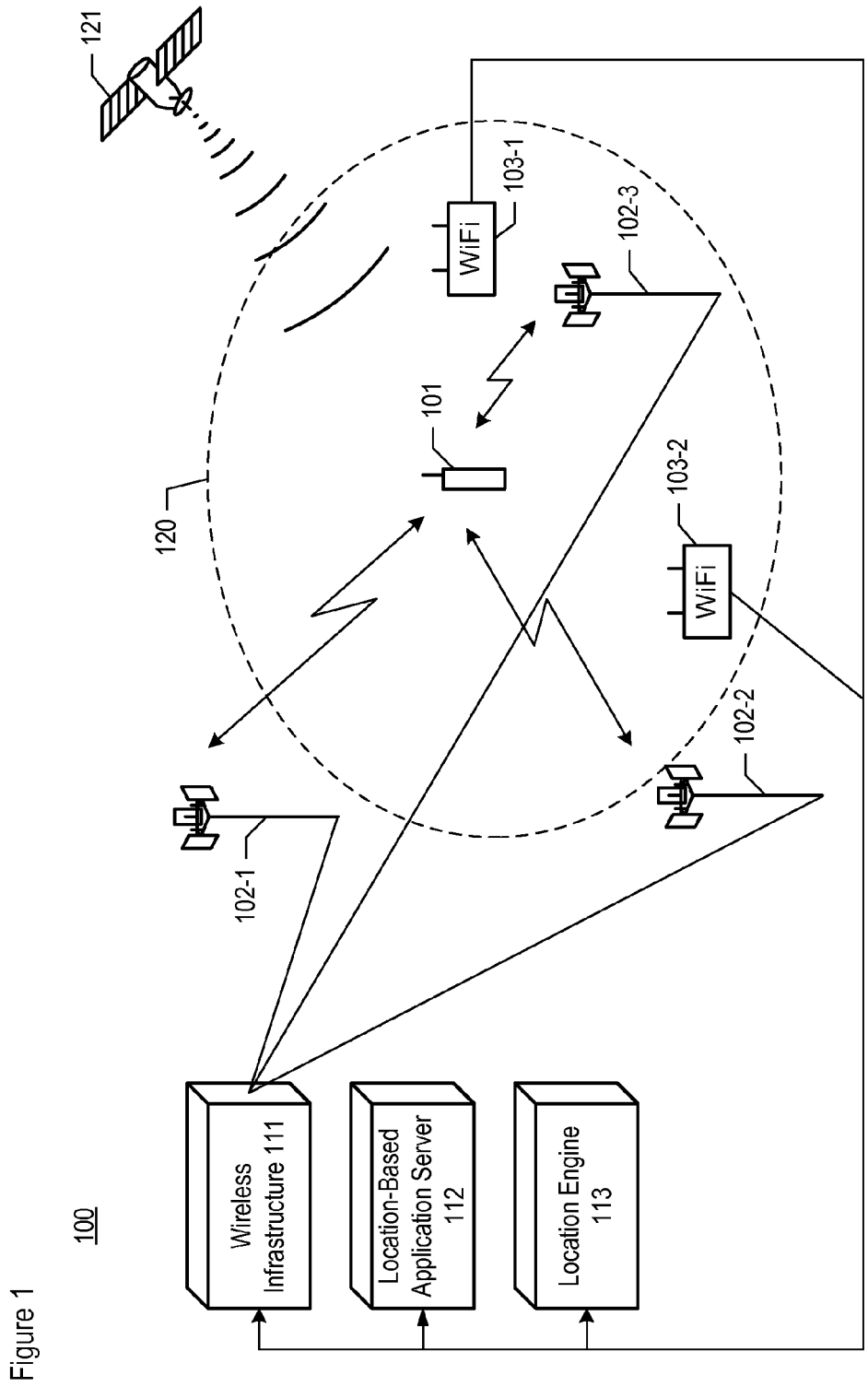
FIG. 1 depicts a diagram of the salient components of wireless telecommunications system 100 in accordance with the illustrative embodiment of the present invention.

For the purposes of this specification, the phrase "based on" is defined as "being dependent on" in contrast to "being independent of". The value of Y is dependent on the value of X when the value of Y is different for two or more values of X. The value of Y is independent of the value of X when the value of Y is the same for all values of X. Being "based on" includes both functions and relations.

Estimate of the Probability that the Wireless Terminal is Indoors—

For the purposes of this specification, an "estimate of the probability that the wireless terminal is indoors" is defined as the complement of an estimate of the probability that the wireless terminal is outdoors (i.e., P(indoors)=1−P(outdoors)).

Generate—

For the purposes of this specification, the infinitive "to generate" and its inflected forms (e.g., "generating", "generation", etc.) should be given the ordinary and customary meaning that the terms would have to a person of ordinary skill in the art at the time of the invention.

Identity of a Radio Signal—

For the purposes of this specification, the phrase "identity of a radio signal" is defined as one or more indicia that distinguish one radio signal from another radio signal. Cell ID is an example of an identity of a radio signal.

Location—

For the purposes of this specification, the term "location" is defined as a zero-dimensional point, a finite one-dimensional path segment, a finite two-dimensional surface area, or a finite three-dimensional volume.

Location-Dependent Trait of a Radio Signal—

For the purposes of this specification, the term "location-dependent trait of a radio signal" is defined as a characteristic of a radio signal that varies with:
  (i) the location of the transmitter of the signal, or
  (ii) the location of the receiver of the signal, or
  (iii) both i and ii.
For example and without limitation, the amplitude and phase of a radio signal are generally location-dependent traits of the signal. In contrast, the frequency of a radio signal is generally not a location-dependent trait of the signal.

Location-Trait Database—

For the purposes of this specification, a "Location-Trait Database" is defined as a mapping that associates:
  (i) one or more location-dependent traits of one or more radio signals received or transmitted by a wireless terminal, or
  (ii) the identity of one or more radio signals received or transmitted by a wireless terminal, or
  (iii) both i and ii,
at each of a plurality of locations.

Processor—

For the purposes of this specification, a "processor" is defined as hardware or hardware and software that performs mathematical and/or logical operations.

Radio—

For the purposes of this specification, a "radio" is defined as hardware or hardware and software that is capable of telecommunications via an unguided (i.e., wireless) radio signal of frequency less than 600 GHz.

Receive—

For the purposes of this specification, the infinitive "to receive" and its inflected forms (e.g., "receiving", "received", etc.) should be given the ordinary and customary meaning that the terms would have to a person of ordinary skill in the art at the time of the invention.

Transmit—

For the purposes of this specification, the infinitive "to transmit" and its inflected forms (e.g., "transmitting", "transmitted", etc.) should be given the ordinary and customary meaning that the terms would have to a person of ordinary skill in the art at the time of the invention.

Wireless Terminal—

For the purposes of this specification, the term "wireless terminal" is defined as a device that is capable of telecommunications without a wire or tangible medium. A wireless terminal can be mobile or immobile. A wireless terminal can transmit or receive or transmit and receive. As is well known to those skilled in the art, a wireless terminal is also commonly called a cell phone, a pager, a wireless transmit/receive unit (WTRU), a user equipment (UE), a mobile station, a fixed or mobile subscriber unit, a pager, a cellular telephone, a personal digital assistant (PDA), a computer, and any other type of device capable of operating in a wireless environment are examples of wireless terminals.

FIG. 1 depicts a diagram of the salient components of wireless telecommunications system 100 in accordance with the illustrative embodiment of the present invention. Wireless telecommunications system 100 comprises: wireless terminal 101, cellular base stations 102-1, 102-2, and 102-3, Wi-Fi base stations 103-1 and 103-2, wireless infrastructure 111, location-based application server 112, location engine 113, and GPS constellation 121, interrelated as shown.

Wireless infrastructure 111, location-based application server 112, location engine 113, and Wi-Fi base stations 103-1 and 103-2 are all connected to one or more interconnected computer networks (e.g., the Internet, a local-area network, a wide-area network, etc.) and, as such, can exchange data in well-known fashion.

Although the illustrative embodiment depicts wireless telecommunications system 100 as comprising only one wireless terminal, it will be clear to those skilled in the art, after reading this disclosure, how to make and use alternative embodiments of the present invention that comprise any number of wireless terminals.

Wireless terminal 101 comprises the hardware and software necessary to perform the processes described below and in the accompanying figures. Furthermore, wireless terminal 101 is mobile and can be at any location within geographic region 120 at any time.

Wireless terminal 101 is capable of providing bi-directional voice, data, and video telecommunications service to a user (not shown), but it will be clear to those skilled in the art, after reading this disclosure, how to make and use embodiments of the present invention in which wireless terminal 101 provides a different set of services.

In accordance with the illustrative embodiment, wireless terminal 101 is capable of receiving one or more radio signals from each of base stations 102-1, 102-2, and 102-3, Wi-Fi base stations 103-1 and 103-2, and GPS constellation 121, in well-known fashion. Wireless terminal 101 is also capable of identifying each radio signal it receives, in well-known fashion, and of transmitting the identity of each signal it receives to location engine 113. Wireless terminal 101 is further capable of measuring one or more location-dependent traits of each radio signal it receives, in well-known fashion, and of transmitting each measurement it generates to location engine 113. And still furthermore, wireless terminal 101 is capable of measuring a difference of a location-dependent trait of two signals it receives, in well-known fashion, and of transmitting such measurements to location engine 113.

In accordance with the illustrative embodiment, wireless terminal 101 is capable of transmitting one or more radio signals—that can be received by one or more of base stations 102-1, 102-2, and 102-3 and Wi-Fi base stations 103-1 and 103-2—in accordance with specific parameters (e.g., signal strength, frequency, coding, modulation, etc.), in well-known fashion, and of transmitting those parameters to location engine 113.

Cellular base stations 102-1, 102-2, and 102-3 communicate with wireless infrastructure 111 via wireline and with wireless terminal 101 via radio in well-known fashion. As is well known to those skilled in the art, base stations are also commonly referred to by a variety of alternative names such as access points, nodes, network interfaces, etc. Although the illustrative embodiment comprises three base stations, it will be clear to those skilled in the art, after reading this disclosure, how to make and use alternative embodiments of the present invention that comprise any number of base stations.

In accordance with the illustrative embodiment of the present invention, cellular base stations 102-1, 102-2, and 102-3 are terrestrial, immobile, and base station 102-3 is within geographic region 120. It will be clear to those skilled in the art, after reading this disclosure, how to make and use alternative embodiments of the present invention in which some or all of the base stations are airborne, marine-based, or space-based, regardless of whether or not they are moving relative to the Earth's surface, and regardless of whether or not they are within geographic region 120.

Cellular base stations 102-1, 102-2, and 102-3 comprise the hardware and software necessary to be 3GPP-compliant and to perform the processes described below and in the accompanying figures. For example and without limitation, each of cellular base stations 102-1, 102-2, and 102-3 are capable of continually:
 a. receiving one or more radio signals transmitted by wireless terminal 101, and
 b. identifying each radio signal transmitted by wireless terminal 101, in well-known fashion, and of transmitting the identity of those signals to location engine 113, and
 c. measuring one or more location-dependent traits of each radio signal transmitted by wireless terminal 101, in well-known fashion, and of transmitting the measurements to location engine 113, and
 d. transmitting one or more signals to wireless terminal 101 in accordance with specific parameters (e.g., signal strength, frequency, coding, modulation, etc.), in well-known fashion, and of transmitting those parameters to location engine 113.

It will be clear to those skilled in the art how to make and use cellular base stations 102-1, 102-2, and 102-3.

Wi-Fi base stations 103-1 and 103-2 communicate with wireless terminal 101 via radio in well-known fashion. Wi-Fi base stations 103-1 and 103-2 are terrestrial, immobile, and within geographic region 120. Although the illustrative embodiment comprises two Wi-Fi base stations, it will be clear to those skilled in the art, after reading this disclosure, how to make and use alternative embodiments of the present invention that comprise any number of Wi-Fi base stations.

Each of Wi-Fi base stations 103-1 and 103-2 are capable of continually:
 a. receiving one or more radio signals transmitted by wireless terminal 101, and
 b. identifying each radio signal transmitted by wireless terminal 101, in well-known fashion, and of transmitting the identity of those signals to location engine 113, and
 c. measuring one or more location-dependent traits of each radio signal transmitted by wireless terminal 101, in well-known fashion, and of transmitting the measurements to location engine 113, and
 d. transmitting one or more signals to wireless terminal 101 in accordance with specific parameters (e.g., signal strength, frequency, coding, modulation, etc.), in well-known fashion, and of transmitting those parameters to location engine 113.

It will be clear to those skilled in the art how to make and use Wi-Fi base stations 103-1 and 103-2.

Wireless infrastructure 111 comprises a switch that orchestrates the provisioning of telecommunications service to wireless terminal 101 and the flow of information to and from location engine 113, as described below and in the accompanying figures. As is well known to those skilled in the art, wireless switches are also commonly referred to by other names such as mobile switching centers, mobile telephone switching offices, routers, etc.

Location-based application server 112 comprises hardware and software that uses the estimate of the location of wireless terminal 101—generated by location engine 113—in a location-based application, in well-known fashion. Location-based applications are well-known in the art and provide services such as, and without limitation, E-911 routing, navigation, location-based advertising, weather alerts.

Figure 2:
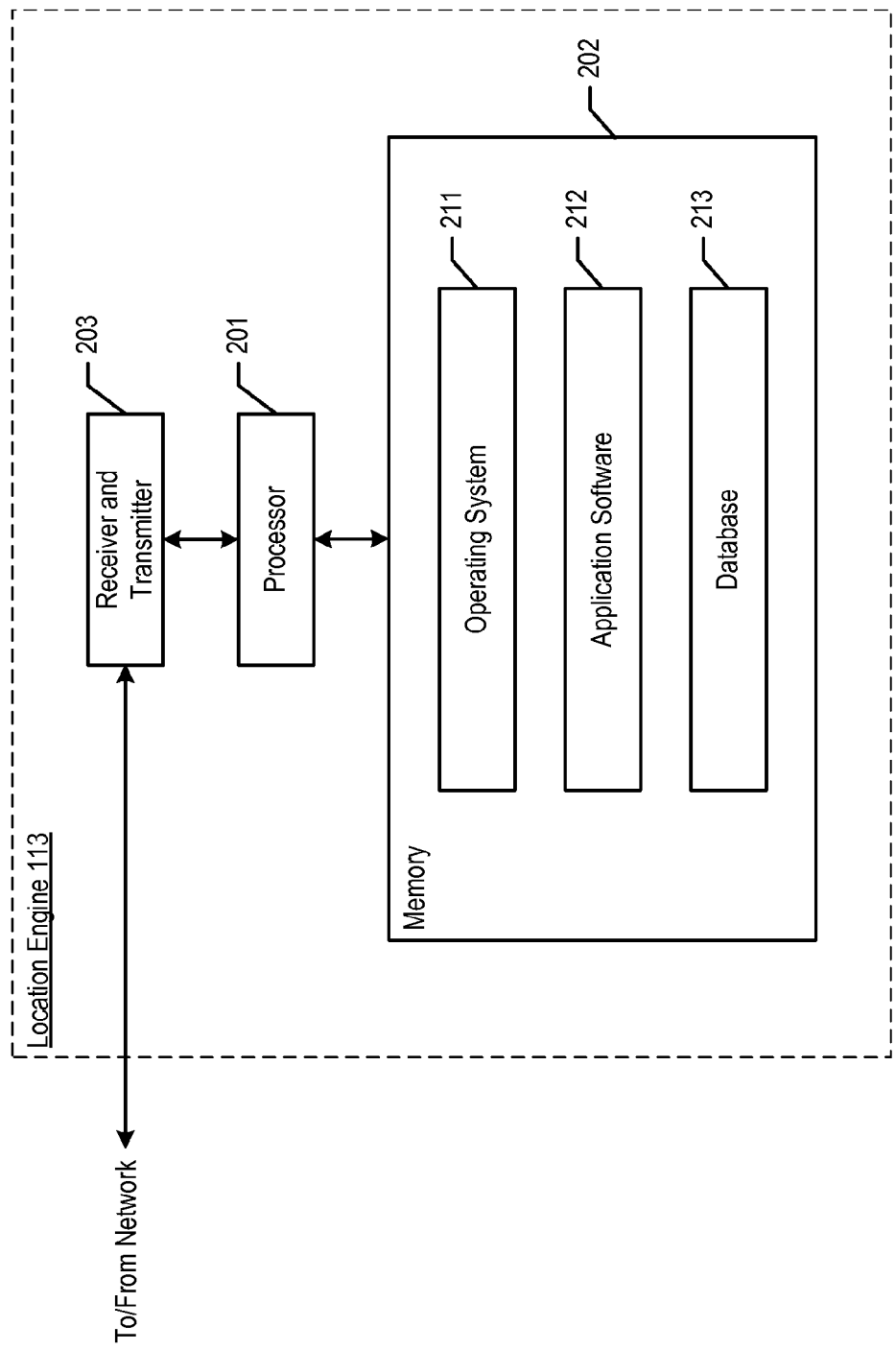
FIG. 2 depicts a block diagram of the salient components of location engine 113 of system 100.

Location engine 113 is a data processing system that comprises hardware and software that generates one or more estimates of the location of wireless terminal 101 as described below and in the accompanying figures. It will be clear to those skilled in the art, after reading this disclosure, how to make and use location engine 113. Furthermore, although location engine 113 is depicted in FIG. 2 as physically distinct from wireless infrastructure 111, it will be clear to those skilled in the art, after reading this disclosure, how to make and use alternative embodiments of the present invention in which location engine 113 is wholly or partially integrated into wireless infrastructure 111. Location engine 113 comprises the location-trait database and the geographic information system (GIS) database, which are described in detail below.

Location Engine 113—

FIG. 2 depicts a block diagram of the salient components of location engine 113 in accordance with the illustrative embodiment. Location engine 113 comprises: processor 201, memory 202, and receiver and transmitter 203, which are interconnected as shown. In accordance with the illustrative embodiment of the present invention, location engine 113 is a server computer; as those who are skilled in the art will appreciate after reading this specification, location engine 113 can be a different type of data-processing system or computing device.

Figure 4:
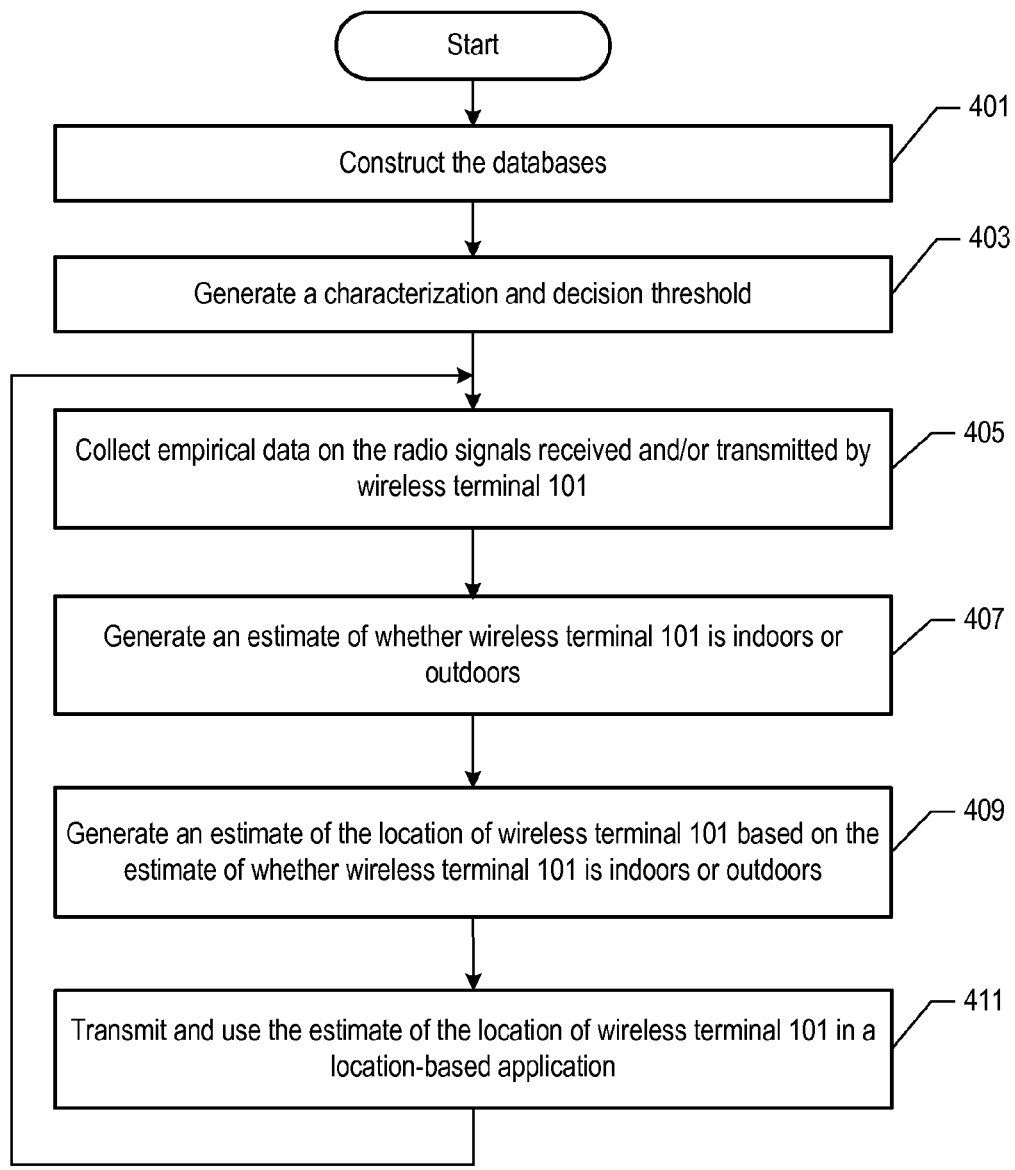
FIG. 4 depicts a flowchart of the salient processes performed in accordance with the illustrative embodiment of the present invention.

Processor 201 is a general-purpose processor that is configured to execute an operating system and the application software that performs the operations described herein, including the operations described in FIG. 4 and other figures. Processor 201 is also capable of populating, amending, using, and managing a location-trait database and a GIS database, and of using one or more classification features as described herein. It will be clear to those skilled in the art how to make and use processor 201.

In general, the location-trait database contains information for the possible locations of wireless terminal 101 and the identity and location-dependent traits of radio signals as if wireless terminal 101 were at each of those locations. In some embodiments, the location-trait database is a database of maps (e.g., those that are described above and in FIG. 3, etc.) that associate each of a plurality of locations to one or more predicted traits associated with a wireless terminal at that location. It will be clear to those skilled in the art how to make and use the location-trait database.

In general, the GIS database contains information for geographic region 120, including without limitation, the physical characteristics of all of the structures (e.g., buildings, etc.) in geographic region 120. It will be clear to those skilled in the art how to make and use the GIS database.

Memory 202 is a non-volatile memory that is configured to store:
 a. operating system 211, and
 b. application software 212, and
 c. database 213, comprising the location-trait database and GIS database.

It will be clear to those skilled in the art how to make and use memory 202.

Receiver and transmitter 203 is configured to enable location engine 113 to receive from and transmit to wireless terminal 101, wireless infrastructure 111, location-based application server 112, and Wi-Fi base stations 103-1 and 103-2, in well-known fashion. It will be clear to those skilled in the art how to make and use receiver and transmitter 203.

Radio Frequency Map of the Illustrative Embodiment—

Figure 3:
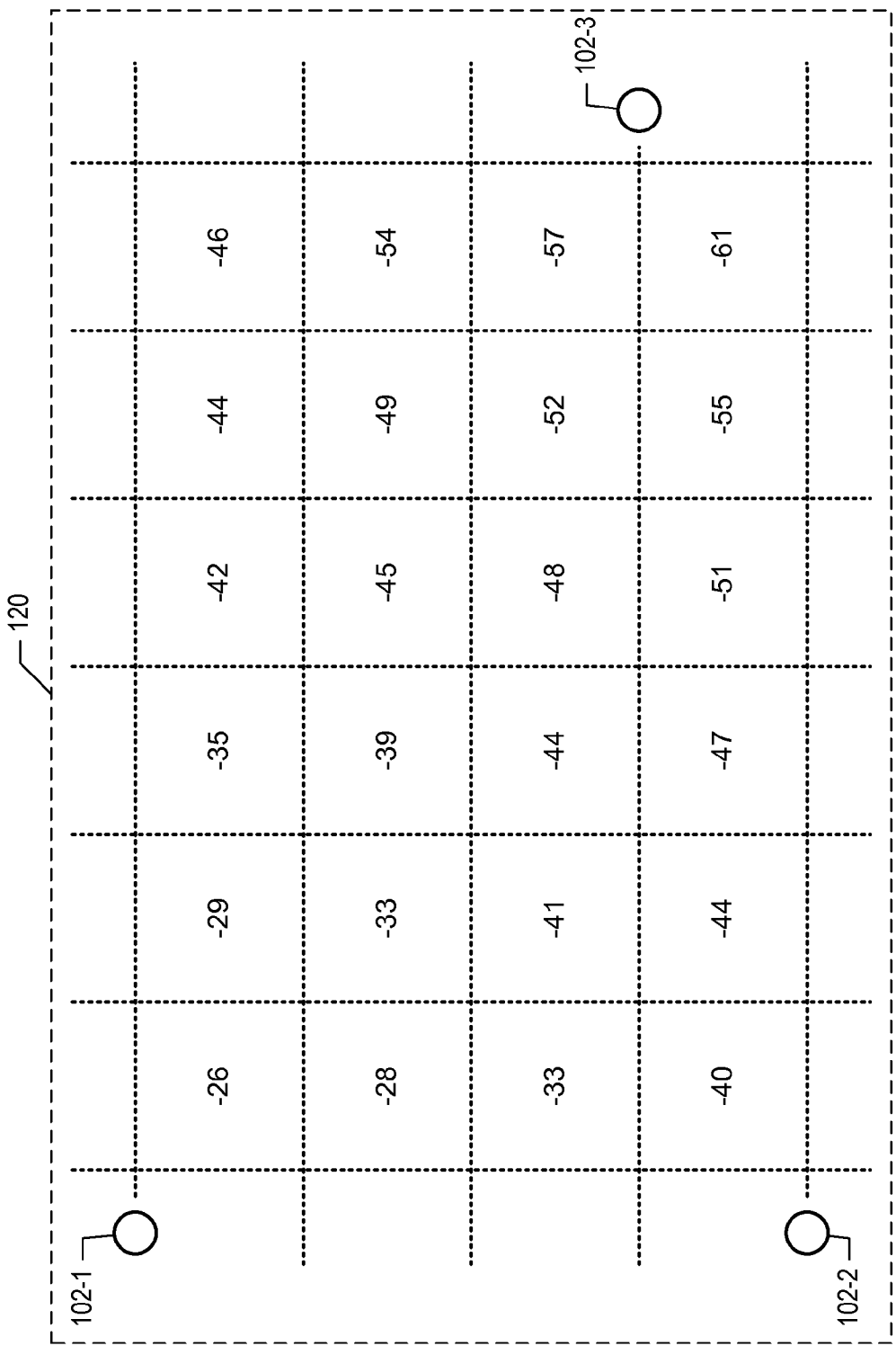
FIG. 3 depicts a radio frequency (RF) map that represents a partitioning of geographic region 120 of system 100 into 24 square locations.

FIG. 3 depicts a radio frequency (RF) map that represents a partitioning of geographic region 120 into 24 square locations. The maps are maintained as part of the location-trait database, which is situated at location engine 113. In general, the map associates:
  i. a plurality of possible locations of wireless terminal 101, with
  ii. a predicted value of a location-dependent trait for each of the possible locations.

In other words, when wireless terminal 101 is at an unknown location, an empirical measurement of the location-dependent trait is a "fingerprint" or "signature" that can be used, in conjunction with the map, to estimate the location of the wireless terminal.

In accordance with the illustrative embodiment of the present invention, the location-dependent trait is the received signal strength as measured in dBm, and each map associates each possible location of wireless terminal 101 with the predicted received signal strength of one signal as transmitted from an antenna of a particular base station—in this case, base station 102-1—and as a function of the calendrical time, T, and the environmental conditions, N. With this in mind, FIG. 3 indicates the mapping of the signal radiated by the antenna of base station 102-1 at Noon on a sunny day. Each of the base station 102-2 and 102-3 antennas similarly has a map that associates each possible location of wireless terminal 101 with the predicted received signal strength of one signal as transmitted from the antenna of the particular base station. How each map is generated is described below and in FIG. 5.

It will, however, be clear to those skilled in the art, after reading this specification, how to make and use alternative embodiments of the present invention in which one or more of the following predicted traits are used, instead of or in addition to the trait of received signal strength:
  i. the predicted pathloss of all of the signals receivable by wireless terminal 101 when wireless terminal 101 is at the location, from all transmitters (e.g., base stations 102-1 through 102-3, commercial television, commercial radio, navigation, ground-based aviation, etc.), as a function of the calendrical time, T, and the environmental conditions, N; and
  ii. the predicted pathloss of all of the signals transmitted by wireless terminal 101 when wireless terminal 101 is in the location as receivable at base stations 102-1 through 102-3, as a function of the calendrical time, T, and the environmental conditions, N; and
  iii. the predicted received signal strength of all of the signals transmitted by wireless terminal 101 when wireless terminal 101 is in the location as receivable at base stations 102-1 through 102-3, as a function of the calendrical time, T, and the environmental conditions, N; and
  iv. the predicted received signal-to-impairment ratio (e.g., Eb/No, etc.) of all of the signals receivable by wireless terminal 101 when wireless terminal 101 is in the location, from all transmitters, as a function of the calendrical time, T, and the environmental conditions, N; and
  v. the predicted received signal-to-impairment ratio of all of the signals transmitted by wireless terminal 101 when wireless terminal 101 is in the location as receivable at base stations 102-1 through 102-3, as a function of the calendrical time, T, and the environmental conditions, N; and
  vi. the predicted received temporal difference of each pair of multipath components (e.g., one temporal difference for one pair of multipath components, a pair of temporal differences for a triplet of multipath components, etc.) of all of the signals receivable by wireless terminal 101 when wireless terminal 101 is in the location, from all transmitters, as a function of the calendrical time, T, and the environmental conditions, N; and
  vii. the predicted received temporal difference of each pair of multipath components (e.g., one temporal difference for one pair of multipath components, a pair of temporal differences for a triplet of multipath components, etc.) of all of the signals transmitted by wireless terminal 101 when wireless terminal 101 is in the location as receivable at base stations 102-1 through 102-3, as a function of the calendrical time, T, and the environmental conditions, N; and
  viii. the predicted received delay spread (e.g., RMS delay spread, excess delay spread, mean excess delay spread, etc.) of all of the signals receivable by wireless terminal 101 when wireless terminal 101 is in the location, from all transmitters, as a function of the calendrical time, T, and the environmental conditions, N; and
  ix. the predicted received delay spread (e.g., RMS delay spread, excess delay spread, mean excess delay spread, etc.) of all of the signals transmitted by wireless terminal 101 when wireless terminal 101 is in the location as receivable at base stations 102-1 through 102-3, as a function of the calendrical time, T, and the environmental conditions, N; and
  x. the predicted received relative arrival times of two or more multipath components of all of the signals receivable by wireless terminal 101 when wireless terminal 101 is in the location, from all transmitters (which can be determined by a rake receiver in well-known fashion), as a function of the calendrical time, T, and the environmental conditions, N; and
  xi. the predicted received relative arrival times of two or more multipath components of all of the signals transmitted by wireless terminal 101 when wireless terminal 101 is in the location as receivable at base stations 102-1 through 102-3, as a function of the calendrical time, T, and the environmental conditions, N; and
  xii. the predicted round-trip time of all of the signals transmitted and receivable by wireless terminal 101 through base stations 102-1, 102-2, and 102-3, as a function of the calendrical time, T, and the environmental conditions, N; and
  xiii. the predicted round-trip time of all of the signals transmitted and receivable by base stations 102-1, 102-2, and 102-3 through wireless terminal 101, as a function of the calendrical time, T, and the environmental conditions, N; and
  xiv. the identity of the base stations that provide telecommunications service to the location, as a function of the calendrical time, T, and the environmental conditions, N; and
  xv. the identities of the neighboring base stations that provide telecommunications service to the location, as a function of the calendrical time, T, and the environmental conditions, N; and
  the handover state (e.g., soft, softer, 1×, 2×, etc.) of wireless terminal 101 and wireless telecommunication system 100 when wireless terminal 101 is in the location as a function of the calendrical time, T, and the environmental conditions, N.

Operation of the Illustrative Embodiment—

FIG. 4 depicts a flowchart of the salient processes performed in accordance with the illustrative embodiment of the present invention.

The processes performed by wireless telecommunications system 100 of the illustrative embodiment are depicted in the drawings (i.e., FIG. 4 and subsequent figures) as being performed in a particular order. It will, however, be clear to those skilled in the art, after reading this disclosure, that such operations can be performed in a different order than depicted or can be performed in a non-sequential order (e.g., in parallel, etc.). In some embodiments of the present invention, some or all of the depicted processes might be combined or performed by different devices. In some embodiments of the present invention, some of the depicted processes might be omitted.

At task 401, the location-trait database and the GIS database are constructed and stored in memory 202 of location engine 113. Task 401 is described in detail below and in FIG. 5.

At task 403, a characterization that is a composite of one or more classification features is generated, for a given combination of classification features, and stored in memory 202 of location engine 113. In this sense, a "feature" is an individual measurable heuristic property of a phenomenon being observed and can be regarded as an explanatory variable, as is known in the art. Task 403 is described below and in FIG. 6.

In accordance with the illustrative embodiment of the present invention, a solution vector represents the characterization. The solution vector represents how a given combination of features interact to determine when wireless terminal 101 classified as being indoors versus outdoors, when the solution vector and a decision threshold are applied to empirical data that are representative of the wireless terminal.

At task 405, location engine 113 collects empirical data on the radio signals received and transmitted by wireless terminal 101. Task 405 is described in detail below and in FIG. 9.

At task 407, location engine 113 generates an estimate of whether wireless terminal 101 is indoors or outdoors. Task 407 is described in detail below and in FIG. 10.

At task 409, location engine 113 generates an estimate of the location of wireless terminal 101 based on, among other things, the estimate of whether the wireless terminal is indoors or outdoors. Task 409 is described in detail below and in FIG. 11.

At task 411, location engine 113 transmits the estimate of the location of wireless terminal 101 generated at task 409 to location-based application server 112 and/or to wireless terminal 101 for use in a location-based application. In some embodiments of the present invention, location engine 113 transmits an indication of whether wireless terminal 101 is determined to be indoors or outdoors, based on the estimate that is generated as described below and in task 407. It will be clear to those skilled in the art how to enable embodiments of the present invention to perform task 411. After task 411 is completed, control passes back to task 405.

Task 401: Construct the GIS Database and the Location-Trait Database—

Figure 5:
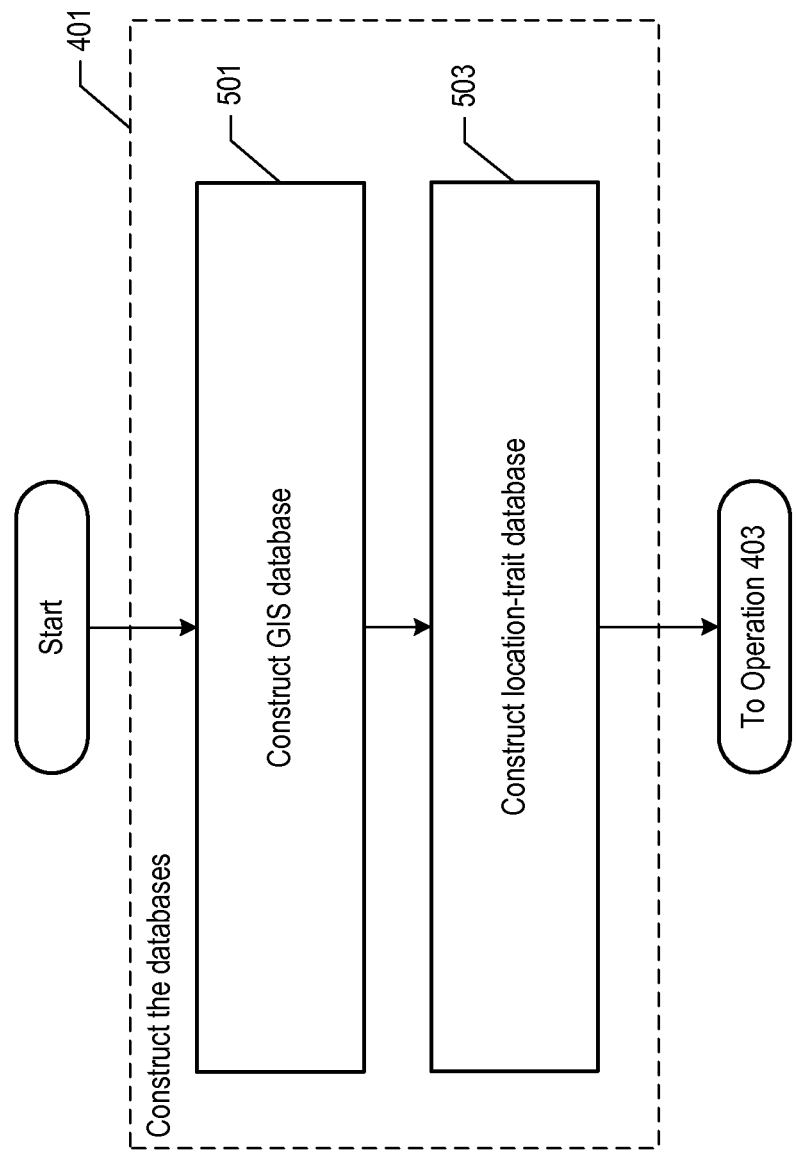
FIG. 5 depicts a flowchart of the salient processes performed in accordance with task 401.

FIG. 5 depicts a flowchart of the salient processes performed in accordance with task 401.

At task 501, the GIS database is constructed and stored in memory 202 of location engine 113. It will be clear to those skilled in the art how to accomplish task 501.

At task 503, the location-trait database is constructed and stored into memory 202 of location engine 113. As part of task 503, the identity of—and location-dependent traits for—each radio signal that each of cellular base stations 102-1, 102-2, and 102-3, Wi-Fi base stations 103-1 and 103-2 is expected to be able to receive from wireless terminal 101, for each possible location of wireless terminal 101, is determined in well-known fashion.

It will be clear to those skilled in the art how to accomplish task 503, and in accordance with the illustrative embodiment, this is accomplished through a combination of "drive testing" (i.e., empirical data gathering) and radio-frequency propagation modeling. See for example and without limitation, U.S. Patent Application Publications 2008/0077356, 2008/0077472, and 2008/0077516, which are incorporated by reference.

Task 403: Generate a Characterization, Determine a Decision Threshold—

Figure 6:
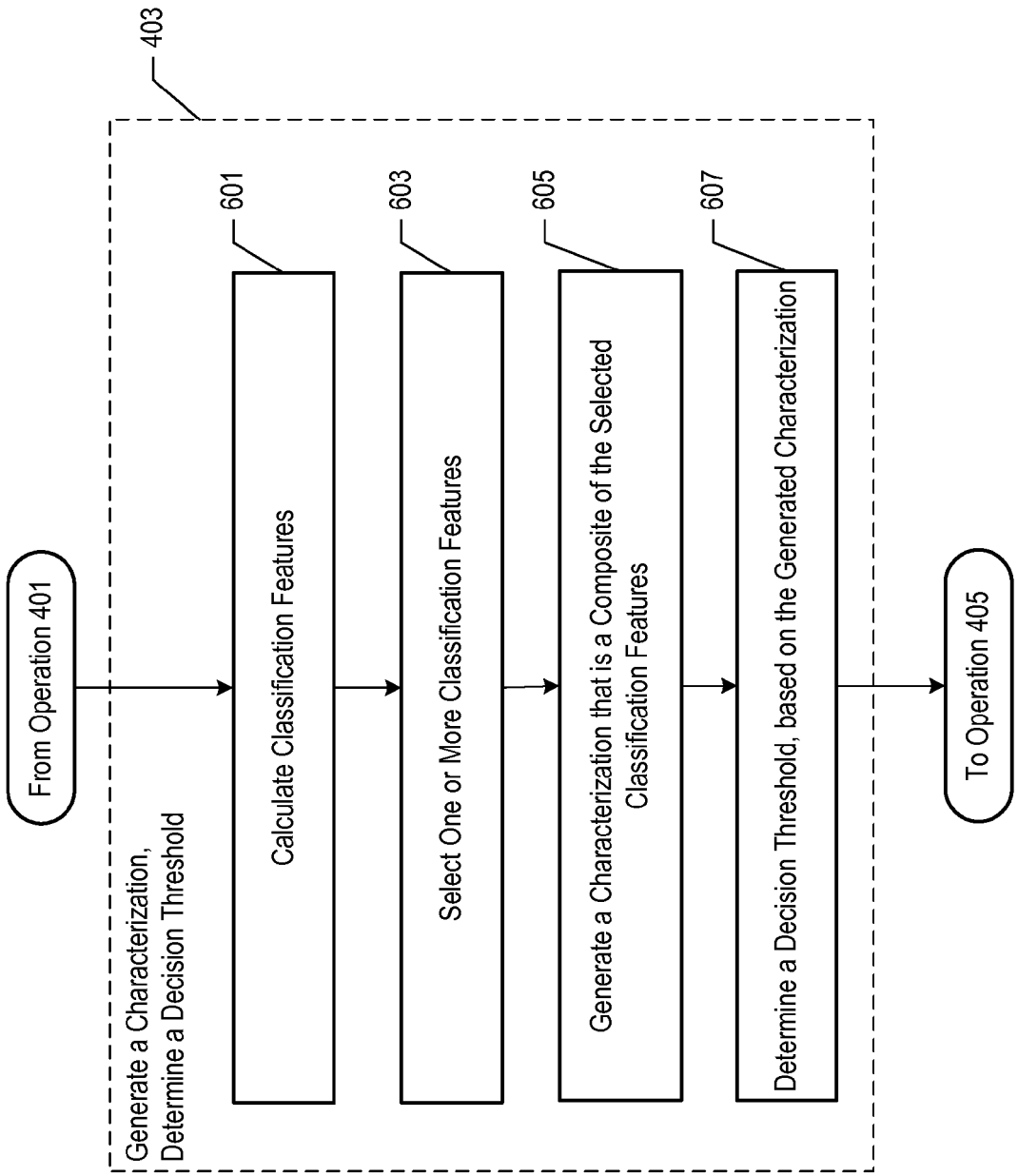
FIG. 6 depicts a flowchart of the salient processes performed in accordance with task 403.

FIG. 6 depicts a flowchart of the salient processes performed in accordance with task 403.

At task 601, one or more classification features are calculated and stored into memory 202 of location engine 113, based on call data occurring over a predetermined interval. In some embodiments, the data comprises measurements of radio signals received by a plurality of wireless terminals over time and/or the identities of those radio signals, and then acquired (e.g., via network measurement reports, etc.) and collected in the network over time. Each classification feature characterizes a location-dependent trait (e.g., signal strength, etc.), at least to the extent that a wireless terminal can be classified as being at an indoor location or at an outdoor location. In some embodiments of the present invention, such a location-dependent trait is directly measurable by a wireless terminal and/or by a base station, while in some other embodiments it is not directly measurable. In some embodiments of the present invention, each classification feature is calculated as a single value per call. A characterization of a classification feature across the aggregation of calls in a data set can be represented as a histogram, as a cumulative distribution function (CDF), or as another suitable description, for example and without limitation. Task 601 is described in detail below and in FIG. 7.

At task 603, one or more classification features are selected, to be used in determining whether wireless terminal 101 is indoors or outdoors. For example and without limitation, the Neighbor Count feature, the Neighbor RSSI Signal Level feature, and the Neighbor Spanned-Area feature can be combined with one another, in any combination, with improved detection results over at least some of the individual classification features disclosed herein. In some embodiments of the present invention, a combination of two or more classification features yields improved results over each constituent feature by itself, provided that the calculated measures of the classification features are not highly correlated with respect to one another. The classification features can be used in any combination with one another and/or with other indoor-outdoor classification features not depicted in FIG. 7.

At task 505, a characterization that is a composite of the selected classification features is generated and stored into memory 202 of location engine 113. The characterization and/or composite accounts for the selected features, or for various aspects of those features, as described below. In accordance with the illustrative embodiment, a solution vector is generated that is representative of the characterization. An often used method to fit data to known outcomes is linear least-squares (LLS). It only requires the computation of a pseudo-inverse, for example using singular value decomposition (SVD). In its purest form there are no parameters to tune. Since the indoor/outdoor classification problem has binary outcomes, the problem can be posed as $$x = \operatorname*{argmin}_{x} \|Ax - b\|_2^2, \quad A \in R^{n \times m}, b \in R^n, x \in R^{n2}. \quad \text{(Eq. 1)}$$

In the foregoing equation, A is the matrix with the classification feature values (each call is a row, each feature a column), and b is the vector of zeros and ones, where an indoor call is set to one, and an outdoor call to zero. To accommodate a bias in the feature values, the first column of A is set to all ones. The dimension n is the number of calls, and m is the number of features plus one (bias). The solution vector x can be computed by $$x = A^\dagger b, \quad \text{(Eq. 2)}$$

where $(\bullet)^\dagger$ denotes the pseudo-inverse.

In some embodiments of the present invention, another type of classifier can be used such as, but not limited to, linear programming-based classification, a classification or decision tree, econometric modeling-based classification, and so on.

Figure 8:
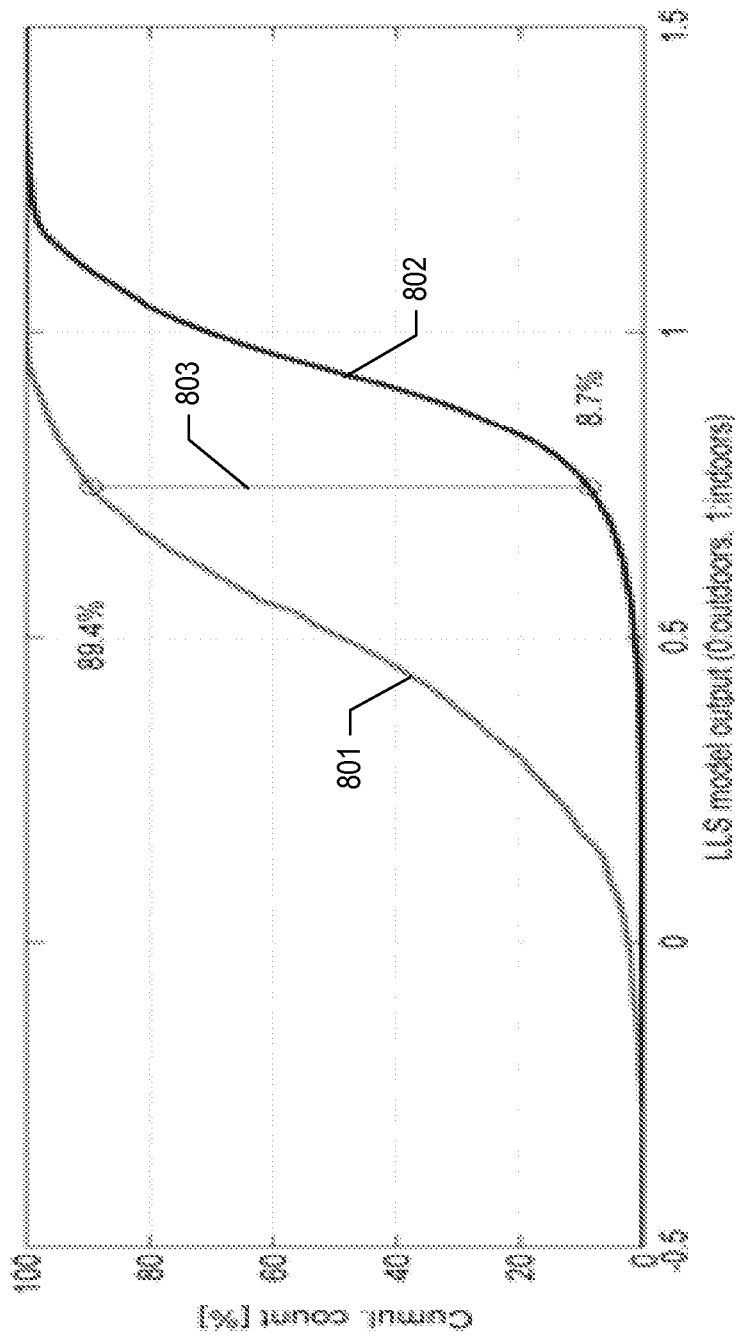
FIG. 8, depicts cumulative distribution functions of outdoor calls and indoor calls.

At task 607, a decision threshold $T_D$ is determined based on the generated solution matrix. An optimal threshold can be determined by looking at the cumulative distribution function (CDF) of Ax for indoor and outdoor calls, and finding the largest gap, as depicted in FIG. 8. In FIG. 8, CDF 801 is a cumulative distribution function of outdoor calls, and CDF 802 is a cumulative distribution function of indoor calls. Gap 803 represents the largest gap between CDFs 801 and 803 and can be used to determine the decision threshold.

In some other embodiments of the present invention, a different decision threshold can be determined, for example and without limitation by shifting the threshold it is possible to trade-off false positives against false negatives, but at the expense of a lower overall gap. It will be clear to those skilled in the art, after reading this specification, how to account for the relative orientation of indoor and outdoor data in the CDFs, in determining the threshold value.

Task 601: Calculate Classification Features—

Figure 7:
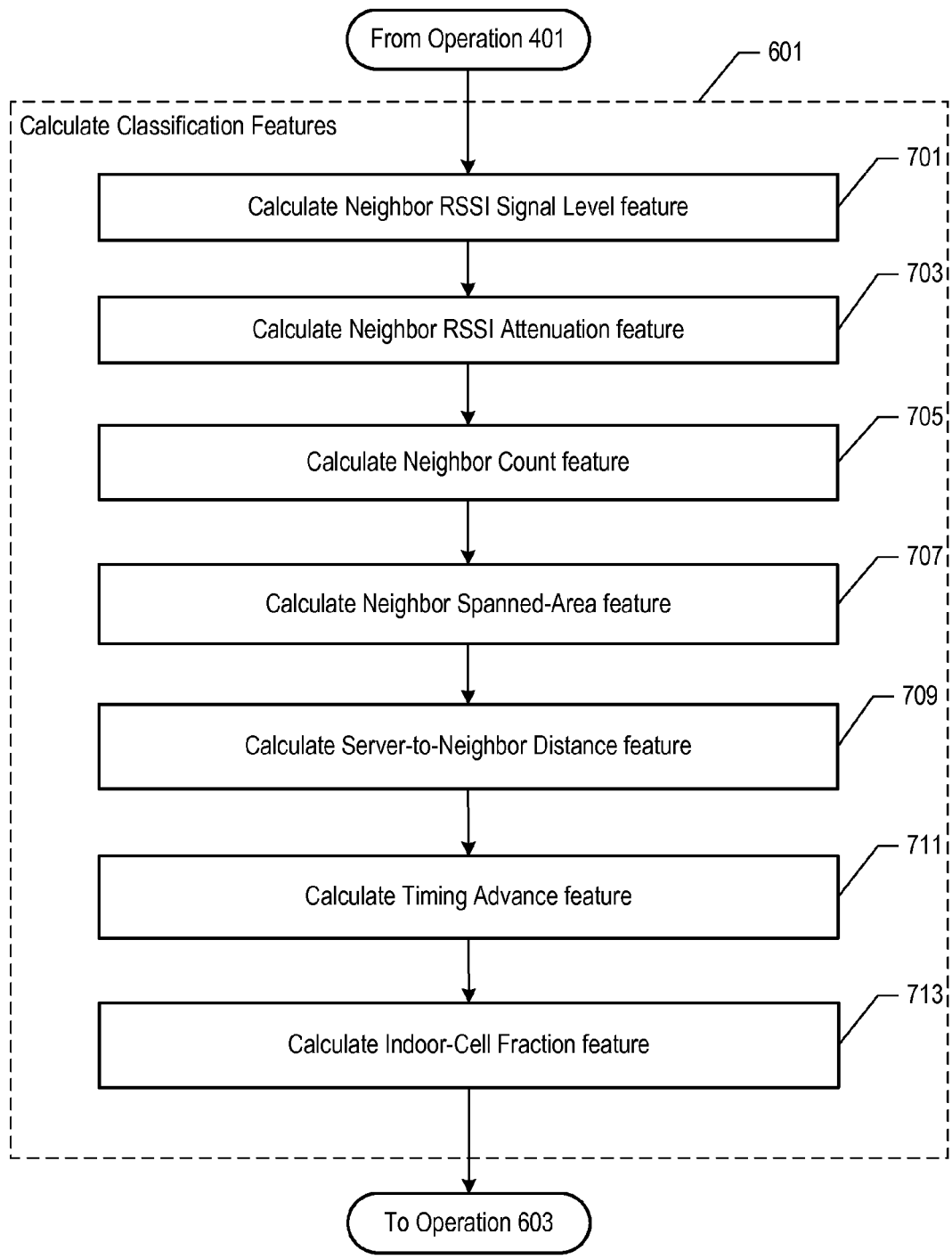
FIG. 7 depicts a flowchart of the salient processes performed in accordance with task 601.

FIG. 7 depicts a flowchart of the salient processes performed in accordance with task 601. The classification features are defined and calculated as follows.

At task 701, the Neighbor RSSI Signal Level feature is calculated. The rationale behind this feature is that because of the attenuation inside buildings, a wireless terminal should report lower reported signal strengths (RSSI) for the non-serving cells. To quantify this, the mean RSSI for a non-serving reported cell is computed, such as from slot 3 or 4 assuming a network measurement report (NMR) whose reporting slots are ordered from strongest to weakest reported neighbor. A low mean indicates being indoors. In some embodiments, the strongest non-serving cell measurement is used, while in some other embodiments a non-strongest, non-serving cell measurement is used. Additionally, to be more generic, the RSSI can be computed as the mean over all of the slots. To capture the average RSSI, as well as the fluctuation, both the mean and standard deviation are considered features of interest.

At task 703, the Neighbor RSSI Attenuation feature is calculated. The rationale behind this feature is to capture the attenuation in the propagation path between the radio signal source (e.g., a base station, etc.) and a wireless terminal. The difference between the RSSI and the cell transmit power is a measure of the attenuation.

At task 705, the Neighbor Count feature is calculated. The rationale behind this feature is that due to the attenuation inside buildings an indoor wireless terminal should see fewer cells than an outdoor wireless terminal. Therefore, one can count how often a neighbor is missing in the sequence of NMRs for slots 4, 5, and 6 for at least a certain number of consecutive samples (a configurable window size). A high count should predict being indoors. In addition, it is assumed that indoors a wireless terminal will see the same cell more often. One could count the number of times a cell ID is reported consecutively, or even the number of time a cell ID is reported consecutively in the same list position. Taking these two concepts into account results in a count of the number of neighbors; this can be done per NMR, or per call. Also, the average number of NMRs that a neighbor cell is listed (a measure of residence time) can be computed. A large value for neighbor count or small value of neighbor residence time indicates that a wireless terminal is seeing the same cell less often.

At task 707, the Neighbor Spanned-Area is calculated. The rationale behind this feature is that due to the attenuation inside buildings an indoor wireless terminal should only see cells that are closer. Therefore, the area of smallest convex hull enclosing the reported cells is computed, for example using cell latitude/longitude data. A smaller area indicates a higher probability of being indoors.

At task 709, the Server-to-Neighbor Distance is calculated. Similar to the previous feature, a measure of how far away the wireless terminal can see cells around it, is the mean distance from the serving cell (in lieu of the wireless terminal location) to the reported neighbors. This value can be scaled using the cell density, in order to reduce sensitivity to the network topology.

At task 711, the Timing Advance feature is calculated. Although this can be a coarse measure for areas with dense cell coverage (its value being limited to 0 or 1 for some data sets), a mean over a call may give a more accurate fractional value. A difference of this feature from the previous feature is that it measures the distance from the serving cell to the wireless terminal.

At task 713, the Indoor-Cell Fraction feature is calculated. If the serving cell is a known indoor cell, it is likely that the wireless terminal is also indoors. Also, this concept can be applied equally to the neighbor cells.

Task 405: Collect Empirical Data on Radio Signals—

Figure 9:
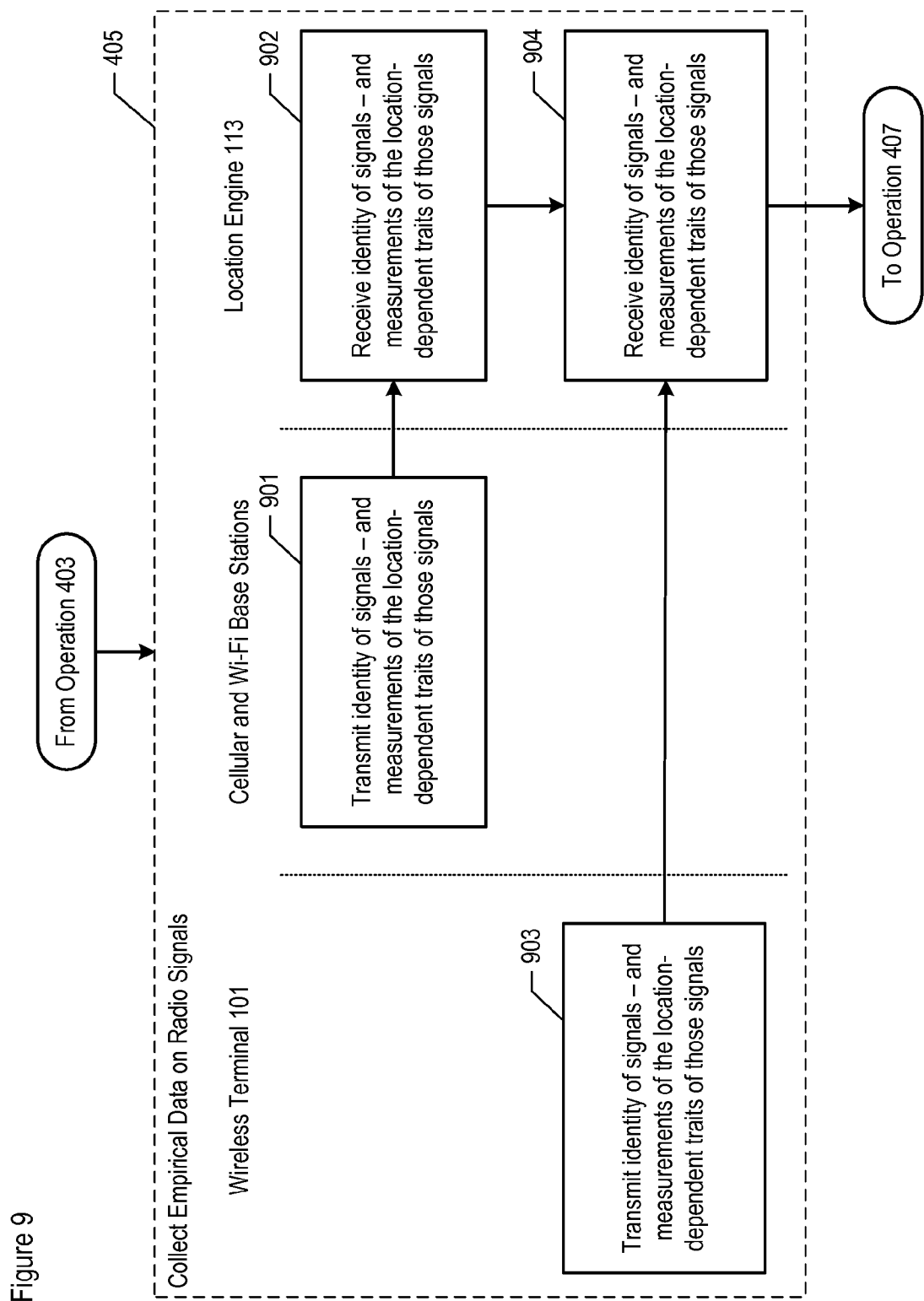
FIG. 9 depicts a flowchart of the salient processes performed in accordance with task 405.

FIG. 9 depicts a flowchart of the salient processes performed in accordance with task 405.

At task 901, each of cellular base stations 102-1, 102-2, and 102-3 and Wi-Fi base stations 103-1 and 103-2 transmits the identity of each signal it has received from wireless terminal 101 and the measurements of the location-dependent traits of those signals. In accordance with the illustrative embodiment, task 901 is performed every 20 milliseconds, but it will be clear to those skilled in the art how to make and use alternative embodiments of the present invention that transmit the measurements at other times.

At task 902, location engine receives the identities and measurements transmitted at task 901.

At task 903, wireless terminal 101 transmits the identity of each signal it receives from cellular base stations 102-1, 102-2, and 102-3 and Wi-Fi base stations 103-1 and 103-2 and the measurements of the location-dependent traits of those signals. In accordance with the illustrative embodiment, task 903 is performed every 20 milliseconds, but it will be clear to those skilled in the art how to make and use alternative embodiments of the present invention that transmit the measurements at other times.

At task 904, location engine receives the identities and measurements transmitted at task 903.

In accordance with the illustrative embodiment, tasks 901, 902, 903, and 904 are performed continuously, concurrently, and asynchronously.

Task 407: Generate an Estimate of Whether Terminal 101 is Indoors or Outdoors—

Figure 10:
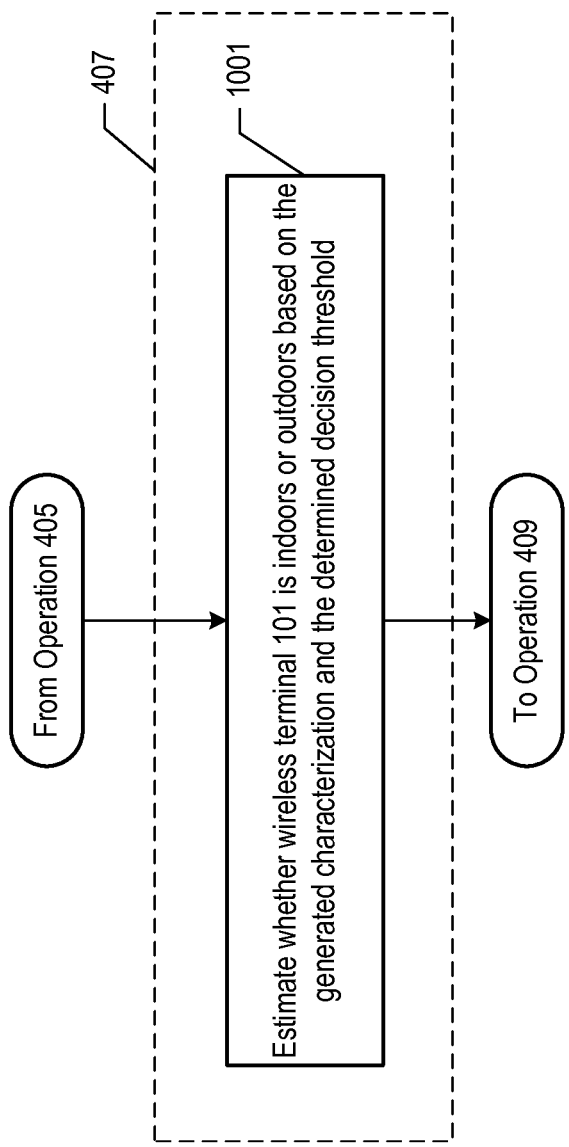
FIG. 10 depicts a flowchart of the salient processes performed in accordance with task 407.

FIG. 10 depicts a flowchart of the salient processes performed in accordance with task 407.

At task 1001, location engine 113 generates an estimate of whether wireless terminal is indoors or outdoors, based on the solution vector x and on $\alpha=[1, f_1, f_2, \ldots f_{m-1}]$, where $f_1$ through $f_{m-1}$ are the feature values computed from the call data in accordance with task 601. Because indoor was set to one, and outdoor to zero, the classification is based on $$\text{if}(\alpha x > T), \text{then indoor=true, else outdoor=true.} \quad \text{(Eq. 3)}$$

wherein T is the decision threshold determined earlier.

In some embodiments of the present invention, location engine 113 also estimates a probability that the wireless terminal is correctly classified as indoors (or outdoors), in well-known fashion. For example and without limitation, the estimated probability can be based on where the decision threshold is set in relation to the cumulative distribution functions in FIG. 8, which dictates how likely it is that the wireless terminal is outdoors when it is decided that the wireless terminal is indoors, and vice-versa.

As those who are skilled in the art will appreciate, after reading this specification, the rest of the location estimation process can be based on the probability estimate generated. For example, the location estimation can react one way if the estimated probability of the wireless terminal being indoors is 95%, while the location estimation can react a different way if the estimated probability is 50%.

In accordance with the illustrative embodiment of the present invention, the detection of whether wireless terminal 101 is indoors or outdoors is based on a relatively short sequence of measurement data. However, as those who are skilled in the art will appreciate after reading this specification, the detection of whether wireless terminal 101 is indoors or outdoors can be based on one or more of i) one or more prior detections of the wireless terminal being indoors, ii) one or more prior detections of the wireless terminal being outdoors, and iii) one or more prior estimates of the location of the wireless terminal, in any combination thereof.

Generating an Estimate of the Location of Wireless Terminal 101—

Figure 11:
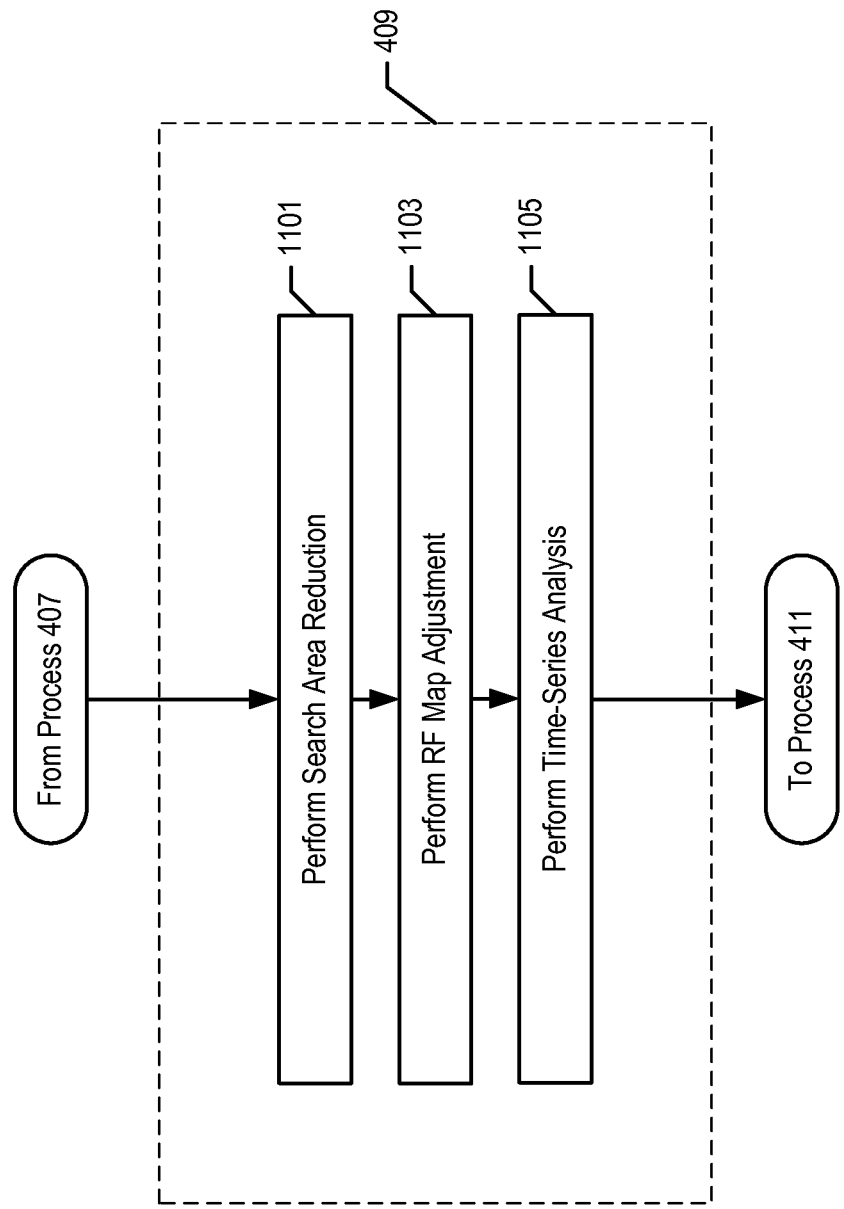
FIG. 11 depicts a flowchart of the salient processes performed in task 409.

FIG. 11 depicts a flowchart of the salient processes performed in task 409—generating an estimate of the location of wireless terminal 101. As an overview, Y probability distributions for the location of wireless terminal 101 are generated for each of instants $H_1$ through $H_Y$ in the temporal interval $\Delta T$, wherein Y is a positive integer, based on comparing the measurements of traits associated with wireless terminal 101 (i.e., the values obtained in task 904) at each of instants $H_1$ through $H_Y$, to predicted values for those traits at those times. Each of the Y probability distributions provides a first estimate of the probability that wireless terminal 101 is in each location at each of instants $H_1$ through $H_Y$. This handling of the probability distributions is described below and in task 1105.

In accordance with task 1101, location server 113 performs a technique called "search area reduction" in preparation for task 1105. To understand what search area reduction is and why it is advantageous, a brief discussion of task 1105 is helpful. In task 1105, location server 113 performs a time-series analysis in order to estimate the probability that wireless terminal 101 is in each location at each of instants $H_1$ through $H_Y$. This requires generating Y multi-dimensional probability distributions, one for each of instants $H_1$ through $H_Y$.

The process for generating each multi-dimensional probability distribution can be computationally intensive and the intensity depends on the number of locations that must be considered as possible locations for wireless terminal 101. When the number of locations that must be considered is small, the process can be performed quickly enough for many "real-time" applications. In contrast, when the number of locations that must be considered is large, the process can often take too long.

Nominally, all of the locations in geographic region 120 must be considered because, prior to task 1101, wireless terminal 101 could be in any location out of possibly thousands, millions, or billions of locations. The consideration of thousands, millions, or billions of locations for each instant by location server 113 might take too long for many real-time applications.

Therefore, to expedite the performance of task 1105, location server 113 performs one or more computationally-efficient tests that quickly and summarily eliminate many possible locations for wireless terminal 101 from consideration, and, therefore, summarily set to zero the probability that wireless terminal 101 is at those locations. This reduces the number of locations that must be fully considered in task 1105 and generally improves the speed with which task 409 is performed.

For additional information in regard to location estimation, including the time-series analysis performed at task 1105, see for example and without limitation U.S. Pat. Nos. 6,944,465, 7,460,505, 7,383,051, 7,257,414, 7,753,278, 7,433,695, 7,848,762, and 8,630,665, each of which is incorporated by reference herein.

Figure 12:
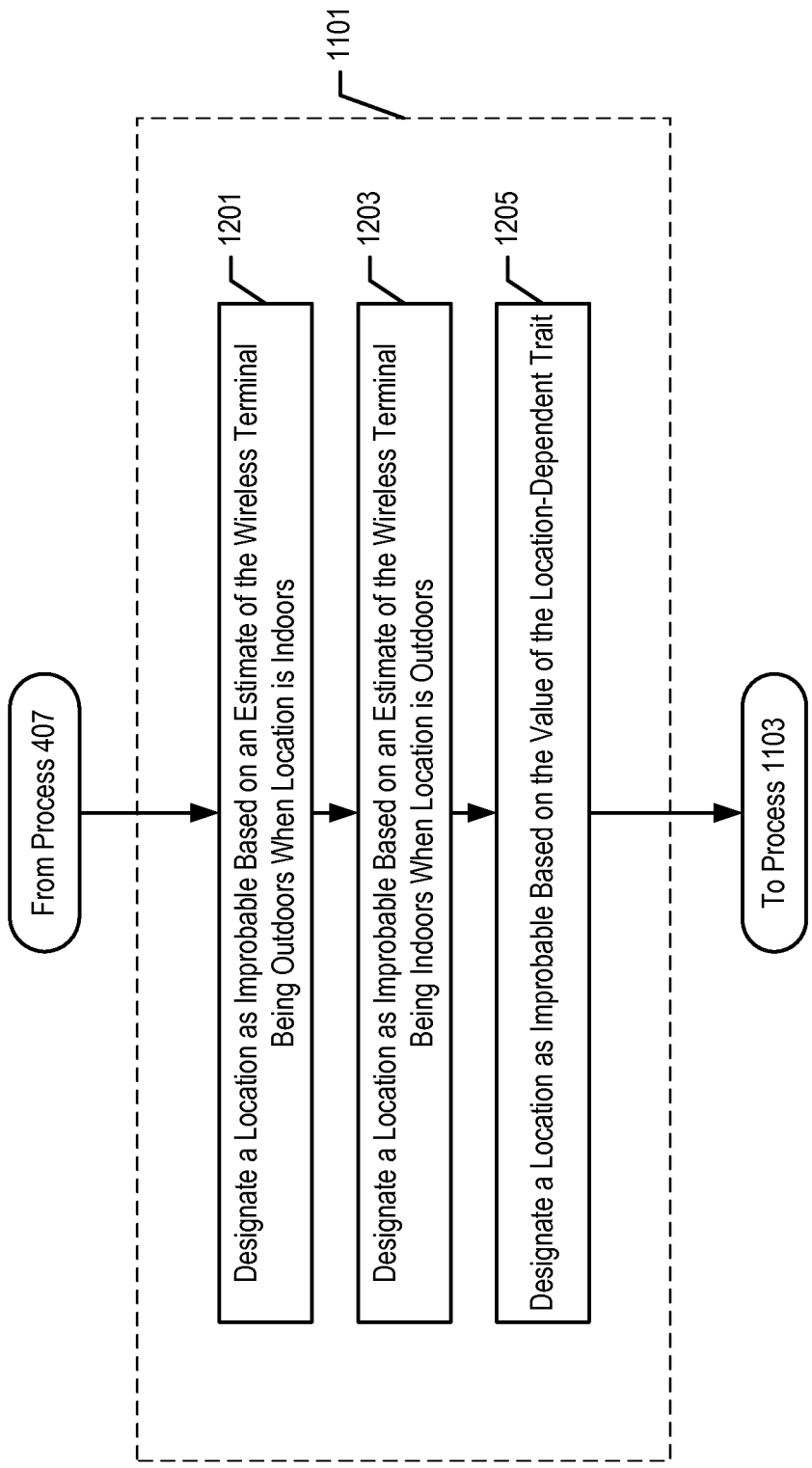
FIG. 12 depicts a flowchart of the salient processes performed in accordance with task 1101.

FIG. 12 depicts a flowchart of the salient processes performed in accordance with task 1101—search area reduction. In some embodiments of the present invention, location server 113 uses additional techniques to those described below, in order to perform search area reduction.

In accordance with task 1201, location server 113 designates a location as improbable based on an estimate of wireless terminal 101 being outdoors, when the location is known to be indoors. The theory underlying this test is when the terminal is estimated to be outdoors, any indoor location is considered to be invalid. Although it is possible that the estimate of the wireless terminal being outdoors might be wrong, the possibility of this occurring can be minimized by selecting the proper criteria (e.g., decision threshold, etc.) for generating the estimate in task 1001.

In accordance with task 1203, location server 113 designates a location as improbable based on an estimate of wireless terminal 101 being indoors, when the location is known to be outdoors. The theory underlying this test is when the terminal is estimated to be indoors, any outdoor location is considered to be invalid. Although it is possible that the estimate of the wireless terminal being indoors might be wrong, the possibility of this occurring can be minimized by selecting the proper criteria (e.g., decision threshold, etc.) for generating the estimate in task 1001.

In some embodiments of the present invention, the probability value estimated at task 1001 is taken into account. For example and without limitation, a sufficiently high probability (e.g., 90%, 95%, 98%, etc.) that wireless terminal 101 is correctly classified might be required in order to designate a location as improbable based on the indoors-outdoors criterion.

In some embodiments of the present invention, a location or portion of a location is known to be indoors or outdoors based on the information (e.g., structures, etc.) contained in the GIS database constructed at task 501. Portions of a particular location might be indoors while other portions of the location might be outdoors, instead of a particular location being either all indoors or all outdoors. In those embodiments, tasks 1201 and 1203 can be ignored or each location in the location-trait database constructed at task 503 in FIG. 5 can be subdivided for the purpose of tracking the indoor portions and outdoor portions of each location.

In some embodiments of the present invention, certain information can be inferred based on the estimate of the wireless terminal being indoors or outdoors. For example and without limitation, a wireless terminal might be inferred as being at ground level when estimated to be outdoors, whereas the same is less likely to be true when the wireless terminal is estimated to be indoors (e.g., could be many floors above ground level, etc.).

In accordance with task 1205, location server 113 designates a location as improbable based on the measurement of the location-dependent trait obtained at task 902 and/or 904. Various tests for designating a location as improbable and that are based on the value of the location-dependent trait are described in U.S. Pat. No. 7,257,414, which is incorporated herein by reference.

A location that that is designated as improbable at instant H, by one or more of the foregoing processes is designated as improbable by task 1101 at instant H.

Figure 13:
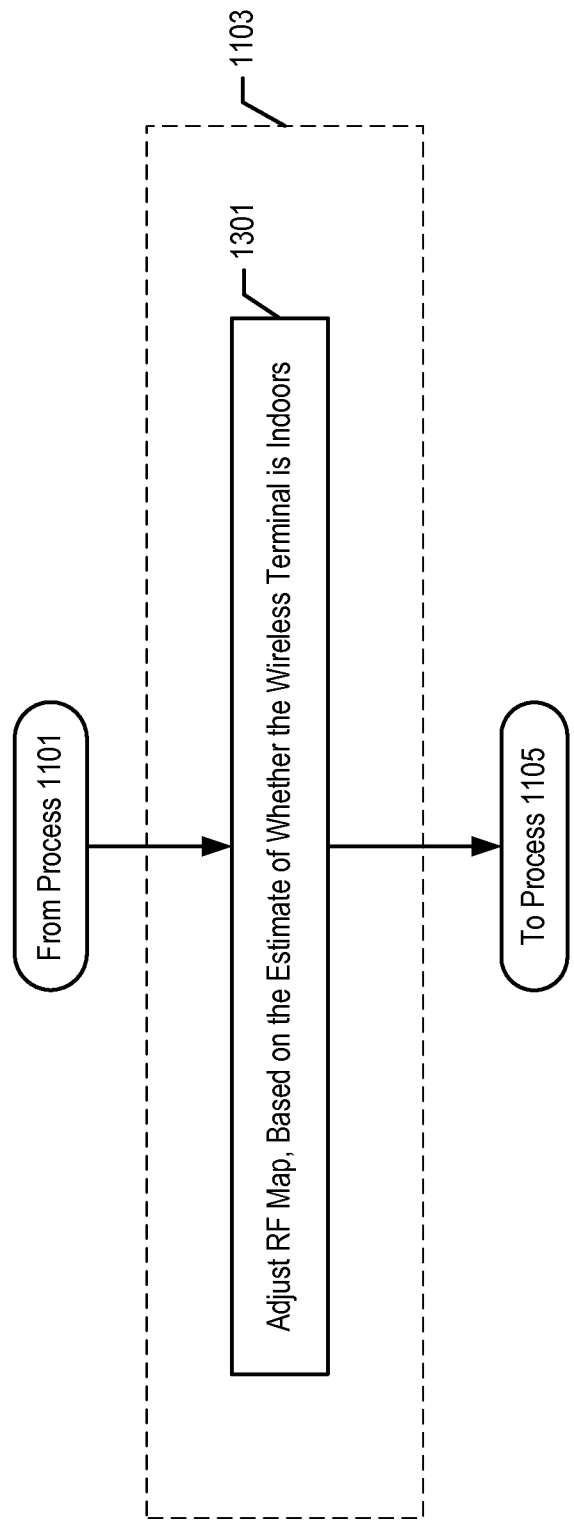
FIG. 13 depicts a flowchart of the salient processes performed in accordance with task 1103.

FIG. 13 depicts a flowchart of the salient processes performed in accordance with task 1103—map adjustment. In accordance with task 1103, location server 113 adjusts an RF map in preparation for task 1105, wherein the map is described above and in FIG. 3. In particular, server 113 adjusts the map that associates: i) a plurality of possible locations of wireless terminal 101 with ii) a predicted value of the location-dependent trait associated with each of the plurality of possible locations of the wireless terminal. The map correlates each of a plurality of locations to one or more predicted traits associated with a wireless terminal at that location. As described in FIG. 3, the maps are stored as part of the location-trait database at location server 113.

In accordance with task 1301, location server 113 adjusts the relevant map stored in the location-trait database, based on an estimate of wireless terminal 101 being indoors.

The theory underlying this adjustment is explained here. As described above, the map correlates each of a plurality of locations to one or more predicted traits associated with a wireless terminal at that location. Each location represented in the map, however, might comprise one or more portions that are indoors and one or more portions that are outdoors. Additionally, the predicted value of each location-dependent trait stored for that location might be representative of the indoor portions or of the outdoor portions, but not necessary of both. Therefore, the predicted values of one or more location-dependent traits for the location may have to be adjusted accordingly, based on whether wireless terminal is estimated to be indoors or outdoors. For example, the predicted signal strength for a particular location might be too high for an indoor portion of the location or too low for an outdoor portion of a location, or both; consequently, the predicted signal strength would have to be adjusted accordingly.

In some embodiments of the present invention, the probability value estimated at task 1001 is taken into account. For example and without limitation, a sufficiently high probability (e.g., 90%, 95%, 98%, etc.) that wireless terminal 101 is correctly classified might be required in order to adjust the map based on the indoors-outdoors criterion.

Classification methods for the purpose of detecting whether a wireless terminal is indoors or outdoors have been disclosed herein. However, as those who are skilled in the art will appreciate after reading this specification, classification methods can also be applied for the purpose of detecting a different type of status of the terminal, such as whether the terminal is moving or stationary.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method of estimating the location of a wireless terminal, the method comprising:
receiving, by a server computer, the identities of one or more radio signals that are received by the wireless terminal;
estimating, by the server computer, a probability that the wireless terminal is indoors based on i) the identities of the one or more radio signals that are received by the wireless terminal and ii) a characterization that is based on the amount of unique identities that have appeared over a predetermined interval, wherein the unique identities are of radio signals that have been received by a plurality of wireless terminals;
designating, by the server computer, at least one of a plurality of possible locations of the wireless terminal as improbable based on the estimated probability that the wireless terminal is indoors; and
estimating, by the server computer, the location of the wireless terminal to be one of the plurality of possible locations of the wireless terminal not designated as improbable.

2. The method of claim 1 wherein the characterization is a composite that accounts for i) the amount of unique identities that have appeared over the predetermined interval and ii) the area of a convex hull spanned by the locations of radio signal sources.

3. The method of claim 1 wherein the characterization is a composite that accounts for i) the amount of unique identities that have appeared over the predetermined interval and ii) the area of a convex hull spanned by the locations of radio signal sources, and iii) the reported signal strength indicator (RSSI) of a predetermined slot in a measurement report, wherein the predetermined slot corresponds to a measurement of a radio signal source of a non-serving cell.

4. The method of claim 3 wherein the predetermined slot further corresponds to a non-strongest measurement of a radio signal source of a non-serving cell.

5. The method of claim 1 further comprising:
receiving, by the server computer, a measurement of a location-dependent trait of a radio signal as received by the wireless terminal;
wherein the estimating of the location of the wireless terminal is based on the measurement of the location-dependent trait of the radio signal.

6. The method of claim 1 wherein the predetermined interval is the length of a call.

7. The method of claim 1 wherein the characterization is a composite that accounts for i) the amount of unique identities that have appeared over the predetermined interval and ii) the amount of measurement reports in which measurements are present for a radio signal source that corresponds to a given unique identity of the unique identities that have appeared.

8. A method of estimating the location of a wireless terminal, the method comprising:
- receiving, by a server computer, the identity of a radio signal that is received by the wireless terminal;
- receiving, by the server computer, a measurement of a location-dependent trait of a radio signal as received by the wireless terminal; and
- estimating, by the server computer, a probability that the wireless terminal is indoors based on i) a characterization of a first classification feature, wherein the characterization is based on multiple measurement reports that are transmitted by a plurality of wireless terminals and accounts for both known indoor calls and known outdoor calls, and ii) a value of the first classification feature, wherein the value of the first classification feature corresponds to the identity of the radio signal and is representative of the wireless terminal; and
- generating, by the server computer, an estimate of the location of the wireless terminal based on i) the measurement of the location-dependent trait of the radio signal and ii) the estimated probability that the wireless terminal is indoors.

9. The method of claim 8 further comprising:
- designating, by the server computer, at least one of a plurality of possible locations of the wireless terminal as improbable based on the estimated probability that the wireless terminal is indoors;
- wherein the estimate of the location of the wireless terminal is one of the plurality of possible locations of the wireless terminal not designated as improbable.

10. The method of claim 8 further comprising:
- designating, by the server computer, at least one of a plurality of possible locations of the wireless terminal as improbable;
- wherein the estimate of the location of the wireless terminal is determined to be one of the plurality of possible locations of the wireless terminal not designated as improbable, and is based on the measurement of the location-dependent trait of the radio signal and on an adjusted database value of the location-dependent trait, wherein the adjusted database value is based on the estimated probability that the wireless terminal is indoors.

11. The method of claim 8 wherein the characterization accounts for the amount of unique identities that have appeared over a predetermined interval, wherein the unique identities are of radio signals that have been received by a plurality of wireless terminals.

12. The method of claim 11 wherein the characterization is a composite that accounts for i) the amount of unique identities that have appeared over the predetermined interval and ii) the area of a convex hull spanned by the locations of radio signal sources.

13. The method of claim 8 wherein the estimating of the probability that the wireless terminal is indoors is further based on ii) a second classification feature that accounts for the reported signal strength indicator (RSSI) of a predetermined slot in a measurement report, wherein the predetermined slot corresponds to a measurement of a radio signal source of a non-serving cell.

14. The method of claim 13 wherein the predetermined slot further corresponds to a non-strongest measurement of a radio signal source of a non-serving cell.

15. A method of estimating the location of a wireless terminal, the method comprising:
- receiving, by a server computer, the identity of a radio signal that is received by the wireless terminal;
- receiving, by the server computer, a measurement of a location-dependent trait of a radio signal as received by the wireless terminal;
- estimating, by the server computer, a probability that the wireless terminal is indoors based on i) a characterization of a first classification feature, wherein the characterization is based on multiple measurement reports that are transmitted by a plurality of wireless terminals, and ii) a value of the first classification feature, wherein the value of the first classification feature corresponds to the identity of the radio signal and is representative of the wireless terminal;
- designating, by the server computer, at least one of a plurality of possible locations of the wireless terminal as improbable based on the estimated probability that the wireless terminal is indoors; and
- generating, by the server computer, an estimate of the location of the wireless terminal as being one of the plurality of possible locations of the wireless terminal not designated as improbable, based on the measurement of the location-dependent trait of the radio signal.

16. The method of claim 15 wherein the characterization accounts for the amount of unique identities that have appeared over a predetermined interval, wherein the unique identities are of radio signals that have been received by a plurality of wireless terminals.

17. The method of claim 16 wherein the characterization is a composite that accounts for i) the amount of unique identities that have appeared over the predetermined interval and ii) the area of a convex hull spanned by the locations of radio signal sources.

18. The method of claim 15 wherein the generating of the estimate of the probability that the wireless terminal is indoors is further based on ii) a second classification feature that accounts for the reported signal strength indicator (RSSI) of a predetermined slot in a measurement report, wherein the predetermined slot corresponds to a measurement of a radio signal source of a non-serving cell.

19. The method of claim 18 wherein the predetermined slot further corresponds to a non-strongest measurement of a radio signal source of a non-serving cell.

* * * * *

UNITED STATES PATENT AND TRADEMARK OFFICE
CERTIFICATE OF CORRECTION

PATENT NO. : 9,332,389 B1
APPLICATION NO. : 14/603947
DATED : May 3, 2016
INVENTOR(S) : David S. Delorenzo and Ahmed Ahmedin Page 1 of 1

It is certified that error appears in the above-identified patent and that said Letters Patent is hereby corrected as shown below:

In the specification

Column 13, line 5 should appear as follows:

-- $x = \arg\min_{x} \|Ax - b\|_2^2, \; A \in R^{n \times m}, b \in R^n, x \in R^m. \quad (Eq. 1)$ --

Signed and Sealed this
Twenty-first Day of June, 2016

Michelle K. Lee
*Director of the United States Patent and Trademark Office*